United States Patent [19]
Deal

[11] 3,807,136
[45] Apr. 30, 1974

[54] METHOD OF PREVENTING SADDLE SORES

[75] Inventor: Stanley E. Deal, Polson, Mont.

[73] Assignee: I-Deal Ideas, Inc., Palson, Mont.

[22] Filed: Dec. 29, 1972

[21] Appl. No.: 319,907

Related U.S. Application Data

[63] Continuation of Ser. No. 204,136, Dec. 2, 1971, abandoned.

[52] U.S. Cl............................. 54/66, 54/44, 54/79
[51] Int. Cl................................................ B68b 7/00
[58] Field of Search............... 54/79, 41, 44, 65–68; 5/337–338

[56] References Cited
UNITED STATES PATENTS

| | | | |
|---|---|---|---|
| 3,417,413 | 12/1968 | Gage | 5/338 |
| 1,127,748 | 2/1915 | Faurot | 54/65 |
| 742,701 | 10/1903 | Maussner | 54/65 |
| 3,466,852 | 9/1969 | Stoner | 54/79 X |
| 3,112,592 | 12/1963 | Schindler | 54/66 X |

Primary Examiner—Robert Peshock
Assistant Examiner—J. N. Eskovitz
Attorney, Agent, or Firm—Merchant, Gould, Smith & Edell

[57] ABSTRACT

Method and apparatus are disclosed for preventing sores on animals such as horses, caused by saddles and the like. A pad is constructed from a synthetic pile fabric by attaching together two portions of the fabric in a back-to-back relationship. The pad is placed between a harness device and the animal to permit limited relative movements between the device and the animal to substantially reduce frictional rubbing movements against the animal's hide, while permitting air circulation between the pad and the hide to facilitate moisture evaporation and cooling.

5 Claims, 8 Drawing Figures

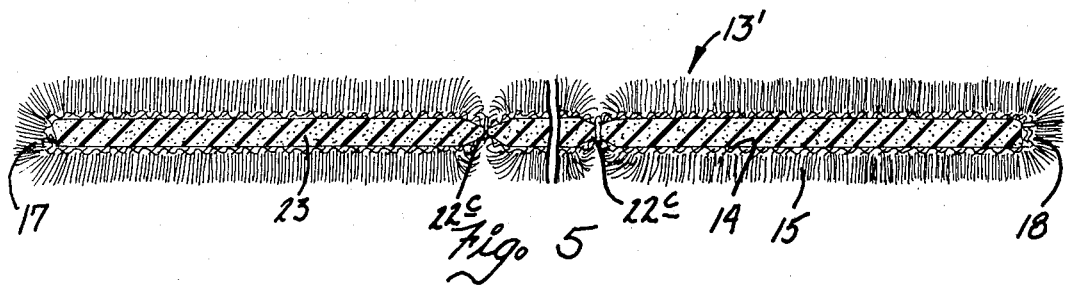
Fig. 5
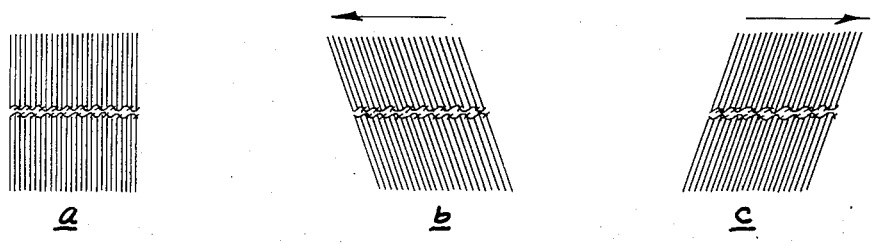
Fig. 6
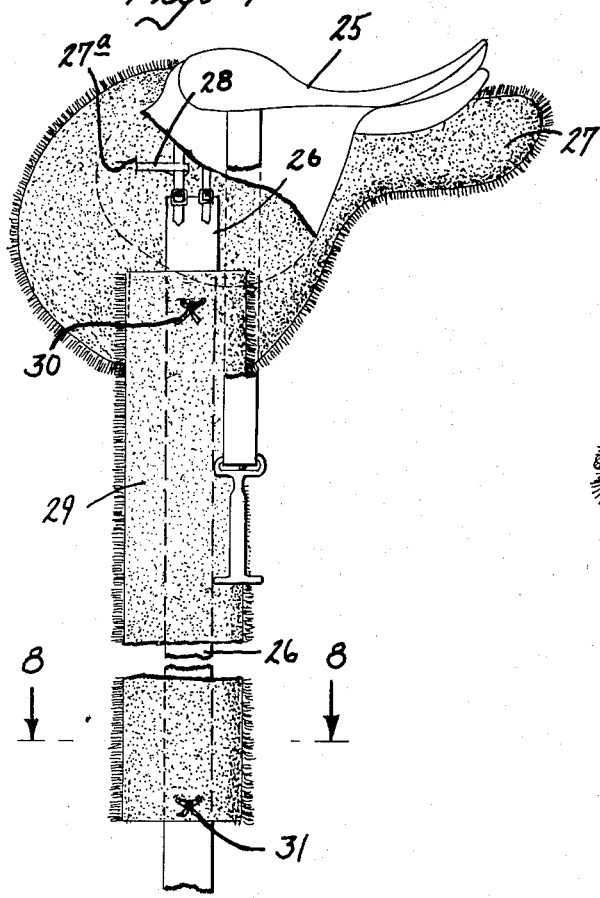
Fig. 7
Fig. 8

METHOD OF PREVENTING SADDLE SORES

CROSS REFERENCE TO RELATED APPLICATION

This application is a continuation of my co-pending application Ser. No. 204,136, filed Dec. 2, 1971, now abandoned.

BACKGROUND OF THE INVENTION

1. Field of the Invention

This invention relates generally to a method of preventing sores, scalds, irritations and bacterial diseases of the hide or skin of an animal such as a horse or mule caused by excessive frictional rubbing or heat resulting from a harness device attached to the animal.

2. Description of the Prior Art

For generations people have been concerned with the problem of protecting domestic animals such as horses or mules from the adverse effects of harness devices. Harness devices such as saddles are typically constructed from leather and are typically attached to the horse by leather straps. For many years, it has been common practice to provide saddle pads, cinch covers, breast collar covers and the like to reduce damage or irrigation to the animal's hide. Although many techniques have been devised over the years to reduce or eliminate this problem, I am not aware that any have been completely successful. Despite the long existence of the problem, and the many attempts that have been made to solve it, we still find horses with saddle sores, cinch sores and girth disease.

One commonly used prior art type of saddle pad is shown in the Hilmer U. S. Pat. No. 3,323,287 that issued June 6, 1967. Hilmer employs a woven fabric next to the horse's hide. The Hilmer pad is also designed to absorb perspiration from the horse. I have found that both of these features are counter-productive, if the purpose of using the pad is to prevent damage or disease. One very serious problem is that with this type of pad, much of the perspiration or moisture from the horse is absorbed into the pad, rather than staying next to the skin. The result is a hot, wet back resulting in scalds. Another problem I have observed is that a woven fabric next to the horse's skin moves or rubs back and forth, eventually wearing the hair off. The result of such rubbing action, as I have observed over and over again, is extreme wear over the withers and loins of the horse.

The same problems occur when a pad such as that shown in the Faurot U. S. Pat. No. 1,127,748 that issued Feb. 9, 1915, is used. The frictional rubbing movements of a fibrous pad like that shown in Faurot wear the hair off and also cause heat. The moisture being absorbed into and carried by the fibrous pad traps this heat and the heat of the animal next to the skin, again resulting in a hot, wet back.

Once the frictional rubbing movements cause the physical loss of hair, a sore spot on the skin soon develops, with the soreness being enhanced by the heat trapped between the pad and the skin. These prior art pads constructed from natural fibers are also susceptible to carrying or transferring bacteria which may infect the sore. These prior art pads, if not scrupulously cleaned at regular intervals, provide a most favorable environment for bacterial growth. Most horesmen do not wash these pads sufficiently often. Continued use without cleaning causes the pad to decrease in porosity, thus increasing the entrapment of heat next to the skin and increasing the probability of an infected sore.

Natural materials such as sheep skin or lamb skin with the wool left on have also been used. This is shown, for example, in the Schindler U. S. Pat. No. 3,112,592 that issued Dec. 3, 1963. Other types of harness pads employing shorn wool or hair attached to a backing fabric are shown in the Dorr et al. U.S. Pat. No. 302,548 dated July 29, 1884 and the Naramore U.S. Pat. No. 423,797 dated Mar. 18, 1890. Although a well constructed pad of this kind, having a thick wool pile next to the horse's skin, may have friction and heat reducing properties similar to those of the present invention, such pads have not been commonly used. Such pads are extremely difficult to wash and indeed, must be washed by hand, and as pointed out in the Hilmer patent, require as much as four days for drying. These pads, if not cleaned regularly, will also develop offensive odors and will support bacterial growth.

The Stoner U.S. Pat. No. 3,466,852 that issued Sept. 16, 1969 discloses a pad having a plastic center sheet with soft paper sheets affixed to the opposite surfaces thereof. The pad is designed to be disposable. The disadvantage I see with this prior art pad construction would be that the paper would soon become waterlogged so as to trap heat next to the skin. The plastic sheet would aid in trapping this heat.

SUMMARY OF THE INVENTION

The present invention not only prevents these sores, scalds, irritations and bacterial diseases from occurring, but I have observed that it also actually permits healing of existing sores. In the preferred embodiment of my invention, I construct a pad from a synthetic, non-allergenic pile fabric having a thin, flexible backing layer with a dense, relatively non-moisture absorptive fibrous pile layer attached to one surface thereof. The pad is constructed by attaching together two selectively sized portions of the pile fabric in a back-to-back relationship. I place the pad so constructed on the horse with one of the pile layers in contact with the animal, and attach the saddle or other harness device over the pad. The extremely dense pile layer distributes the pressure or weight of the harness device evenly over the animal's hide and permits a limited amount of relative movement between the harness device and the animal without producing frictional rubbing movements between the animal and the pad. At the same time, the dense pile layer does not collapse, so that a small amount of air circulation is permitted between the pad and the animal's hide to facilitate moisture evaporation and resultant cooling of the animal's hide. Because of the relative movement, there are no frictional rubbing movements that cause hair to be worn off. The animal does perspire heavily under the pad, but because air circulation is permitted, evaporation is constantly taking place to cool the animal's hide

BRIEF DESCRIPTION OF THE DRAWINGS

FIG. 5 is a sectional view similar to FIGS. 3 and 4 showing an alternate version of the saddle pad;

FIG. 6 is a schematic representation of movements of the pad fibers during use thereof;

FIG. 7 shows another form of saddle and saddle pad and a cinch cover according to the present invention, portions thereof being broken away; and FIG. 8 is a sectional view taken along line 8—8 of FIG. 7.

DESCRIPTION OF THE PREFERRED EMBODIMENT

Figure 1:
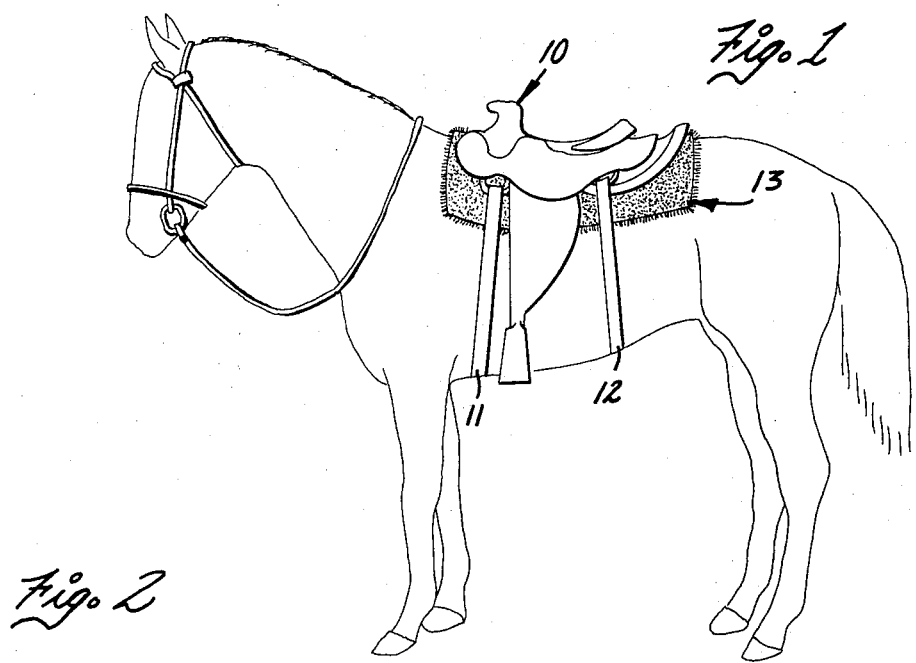
FIG. 1 is a view in side elevation of a horse having a saddle and saddle pad according to my invention.
Figure 2:
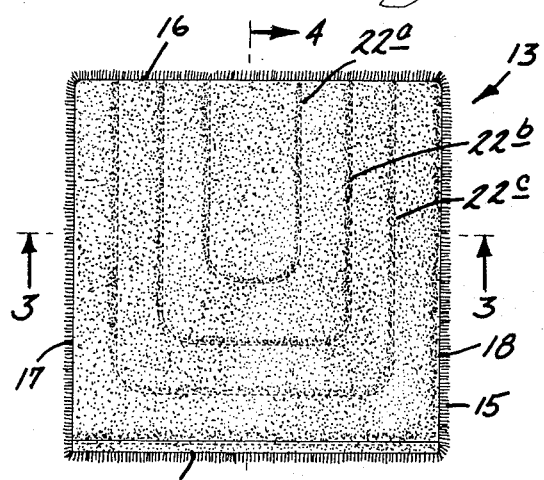
FIG. 2 is a plan view of the saddle pad, lying in a flat position.

Referring now to the drawings wherein like reference numerals are used throughout the several views to indicate like elements of structure, there is disclosed in FIG. 1 a horse having a saddle 10 attached thereto by means of a pair of cinch straps 11 and 12. A saddle pad 13 is interposed between the saddle 10 and the horse's back. Further details of the saddle pad 13 are disclosed in FIGS. 2-4. Pad 13 is constructed from a synthetic, non-allergenic pile fabric having a thin, flexible backing layer 14 with a dense, relatively non-moisture absorptive fibrous pile layer 15 attached to one surface of the backing layer 14. In the preferred embodiment, the backing layer 14 is a relatively hard fabric made from 100 percent polypropylene olefin. The pile layer 15 is 100 percent polyester fiber attached by adhesive or the like to one surface of the backing layer. The fibers are packed closely together to form a dense pile, with the pile layer comprising approximately 85 percent of the weight of the fabric. This entirely synthetic or man-made fabric will not support bacterial growth, is highly resistant to wear, is flame resistant, is machine washable using standard laundry procedures and can be dryed in an automatic dryer. The pads can be laundered and dryed literally hundreds of times without significant adverse effects upon the performance of the pad.

To construct the pad, of the generally rectangular type shown in FIGS. 1-4, a strip of the fabric is folded over along a fold-line 16 forming one edge of the pad to thus provide two selectively sized portions of the pile fabric in a backing layer-to-backing layer relationship with the two pile layers extending in opposite directions. The two side edges 17 and 18 are stitched together and finally the end opposite the fold 16 is also closed as at 19.

Figure 3:
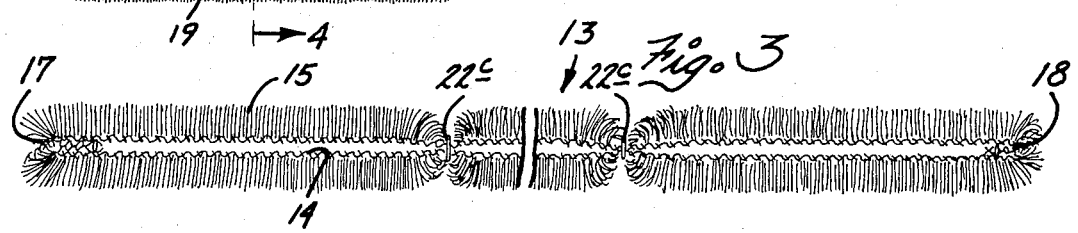
FIG. 3 is an enlarged sectional view of the saddle pad taken along line 3—3 of FIG. 2, portions thereof being broken away.
Figure 4:
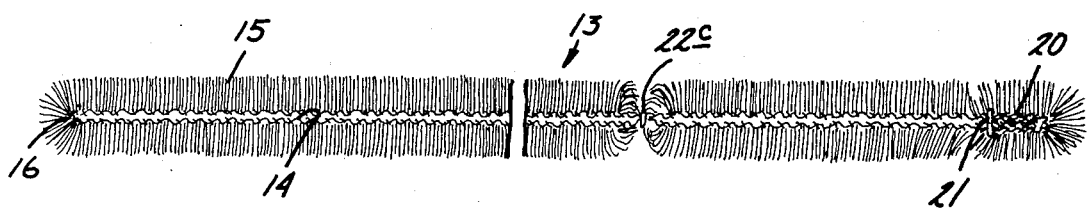
FIG. 4 is an enlarged sectional view of the saddle pad taken along line 4—4 of FIG. 2, portions thereof being broken away.

As shown in FIG. 3, the stitching along the side edges 17 and 18 is done with the pad inside-out, and then the pad is reversed so that the stitching is inside. To close the remaining open end 19, a strip 20 of the same pile fabric is folded over the end as shown in FIG. 4 and stitched thereto as at 21. The next step is to stitch the two portions together at spaced intervals as at 22a, 22b and 22c.

The pad 13, so constructed, is placed on the animal with one pile layer 15 thereof in contact with the hide or skin. The harness device is then attached as shown in FIG. 1 with the pad interposed between the device and the animal so that the pad acts to distribute the pressure of the harness device evenly over the animal's hide. One important feature of the present invention is schematically demonstrated in FIG. 6. In FIG. 6a, a portion of the completed saddle pad is shown in an at-rest position, with the fibers extending perpendicular to the backing layers. Because the fibers are so densely packed, they tend to remain standing even when pressure is applied by the saddle. FIG. 6b represents the situation where the saddle is being forced in the direction of the arrow by the rider. In FIG. 6c, the saddle is being forced in the opposite direction. The purpose of FIG. 6 is to show that for all practical purposes, the tips of the fibers do not move from their initial positions with respect to the horse's skin, but rather bend back and forth as movement demands. In other words, the pad of the present invention permits some relative movement between the saddle and the horse's back without causing frictional rubbing movements between the pad and the horse's back. Doubling the pile fabric back-to-back with the pile sides out allows an additional amount of relative movement between the moving, flexible horse's back, and a rigid saddle, without causing damage inducing rubbing movements to occur.

Another advantage of placing this type of pad between the saddle and the horse's back is that the dense pile fabric adjacent the horse's back permits a small amount of air circulation between the pad and the hide at all times. The pile fabric itself is relatively non-moisture absorptive so that it does not tend to form a soggy heat barrier. Instead, the present pad construction encourages perspiration but at the same time, the air circulation between the pad and the hide permits moisture evaporation and resultant cooling of the hide or skin.

FIG. 5 discloses another form of the invention for use where additional shock absorbing qualities are needed. This pad, designated 13' is constructed in generally the same fashion as previously described, except that a sheet 23 of a soft, compressible shock absorbing material is mounted between the backing layers. I prefer to use rebonded polyurethane foam sheets one inch thick for this purpose. Other shock absorbing materials such as foam rubber could also be used without departing from the invention. A pad of this type may be used under pack saddles or as a roper's pad.

In FIG. 7, another type of saddle is shown, designated by the number 25. Saddle 25 is provided with a cinch strap 26 to secure the saddle to the horse. In this case, a saddle pad 27 is provided having an outer configuration similar to the configuration of the saddle 25. However, the basic construction is the same as that shown in FIGS. 2-4. One additional feature is provided. A leather strap 28 having a loop on one end has its other end extending through an opening 27a in the outer backing layer of the pad. It is sewn between the backing layers to hold the strap securely attached to the pad. Two leather straps 28 are provided, one on each side of the horse. Straps 28 can also be made from a fabric webbing material, which works better and lasts longer than leather. The leather strap 28 is used to attach the pad to the saddle as shown. Cinch cover 29 is a tubular member constructed in the same fashion as saddle pad 13 or saddle pad 27, but the opposite ends are left open so that the cinch strap 26 can extend therethrough. Suitable lacings 30 and 31 are attached to the opposite ends of the cinch cover 29 to secure the cinch cover to the cinch, either by encircling the cinch or by extending through holes in the cinch. Cinch cover 29 thus protects the horse's hide against damage or irritation caused by the cinch strap 26.

It is evident that saddle pads according to the present invention can be constructed in a variety of shapes and sizes and that other forms of pads constructed in like fashion can be used as cinch covers and covers for other straps or harness devices.

What is claimed is:

1. A method of preventing sores, scalds, irritations, and bacterial diseases of the hide or skin of an animal such as a horse or mule caused by excessive frictional rubbing or heat resulting from a saddle device attached to the animal comprising the steps of:
   a. obtaining a pad of synthetic, non-allergenic pile fabric having a thin, flexible backing layer with a dense, relatively non-moisture absorptive fibrous pile layer attached to one surface of said backing layer;
   b. placing the pad on the animal with the pile layer in contact with the animal's hide;
   c. simultaneously with placing the pad on the animal's hide, providing an air circulation pathway between the pad and the animal's hide to facilitate moisture evaporation and resultant cooling of the animal's hide; and
   d. attaching a saddle device to the animal with the pad interposed between the saddle device and the animal.

2. A method of preventing sores, scalds, irritations, and bacterial diseases of the hide or skin of an animal such as a horse or mule caused by excessive frictional rubbing or heat resulting from a saddle device attached to the animal comprising the steps of:
   a. obtaining a pad constructed from a synthetic, non-allergenic pile fabric having a thin, flexible, relatively hard backing layer of 100 percent polypropylene olefin, with a dense, relatively non-moisture absorptive, 100 percent polyester fiber pile layer attached to one surface of said backing layer, with the pile layer comprising approximately 85 percent of the weight of the fabric;
   b. placing the pad on the animal with said pile layer in contact with the animal's hide and simultaneously with placing the pad on the animal's hide, providing an air circulation pathway between the pad and the animal's hide to facilitate moisture evaporation and resultant cooling of the animal's hide; and
   c. attaching a saddle device to the animal with the pad interposed therebetween.

3. The method of claim 2 comprising the additional step of attaching together two selectively sized portions of said pile fabric in a backing layer-to-backing layer relationship so that the two pile layers extend in opposite directions.

4. The method of claim 3 including the step of mounting a soft, compressible shock absorbing sheet of material between said portions.

5. A method of preventing sores, scalds, irritations and bacterial diseases of the hide or skin of an animal such as a horse or mule caused by excessive frictional rubbing or heat resulting from a harness device attached to the animal comprising the steps of:
   a. obtaining a synthetic, non-allergenic pile fabric having a thin, flexible backing layer with a dense, relatively non-moisture absorptive fibrous pile layer attached to one surface of said backing layer;
   b. attaching together two selectively sized portions of said pile fabric in a backing layer-to-backing layer relationship to form a pad having the two pile layers extending in opposite directions;
   c. placing the pad on the animal with one pile layer thereof in contact with the animal's hide and simultaneously with placing the pad on the animal's hide, providing an air circulation pathway between the pad and the animal's hide to facilitate moisture evaporation and resultant cooling of the animal's hide; and
   d. attaching a harness device to the animal with the pad interposed between the harness device and the animal.

* * * * *